(12) United States Patent
Yuan et al.

(10) Patent No.: US 10,084,403 B2
(45) Date of Patent: Sep. 25, 2018

(54) POWER SUPPLY SYSTEM AND CONTROL METHOD THEREFOR

(71) Applicant: Huazhong University of Science and Technology, Wuhan (CN)

(72) Inventors: Xiaoming Yuan, Wuhan (CN); Jiabing Hu, Wuhan (CN); Wei He, Wuhan (CN); Xuejun Xiong, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 677 days.

(21) Appl. No.: 14/672,081

(22) Filed: Mar. 27, 2015

(65) Prior Publication Data

US 2016/0285400 A1 Sep. 29, 2016

(51) Int. Cl.
*H02P 9/10* (2006.01)
*H02J 3/38* (2006.01)

(52) U.S. Cl.
CPC .............. *H02P 9/105* (2013.01); *H02J 3/386* (2013.01); *Y02E 10/763* (2013.01)

(58) Field of Classification Search
CPC ............................... H02J 3/386; F03D 7/0284
See application file for complete search history.

(56) References Cited

U.S. PATENT DOCUMENTS

2012/0292904 A1* 11/2012 Tarnowski .............. H02J 3/386
290/44
2012/0310426 A1* 12/2012 Tarnowski ............ F03D 7/0272
700/287
2015/0088326 A1* 3/2015 Fortmann ............... F03D 7/043
700/287

FOREIGN PATENT DOCUMENTS

CN 103546149 A * 1/2014

OTHER PUBLICATIONS

Abstract for CN103546149A, English Language, printed Feb. 20, 2018.*
ProQuest Dialog English Language Translation for CN103546149A, 16 pages, printed Feb. 20, 2018.*

* cited by examiner

*Primary Examiner* — Fritz M Fleming
(74) *Attorney, Agent, or Firm* — Matthias Scholl, PC; Matthias Scholl

(57) ABSTRACT

A power supply system, including an energy module, a controlled object, an active power controller, and an inertia-synchronization controller. The input end of the energy module operates to acquire external energy, a first output end of the energy module is connected to the controlled object, and the energy module operates to transform the acquired external energy into electric energy, or transform electric energy into electric energy having a different frequency therefrom. The input end of the active power controller is connected to a second output end of the energy module, the output end of the active power controller is connected to the controlled object, and the active power controller operates to control output active power of the controlled object. The input end of the inertia-synchronization controller operates to connect with an AC system. The output end of the inertia-synchronization controller is connected to the controlled object.

7 Claims, 7 Drawing Sheets

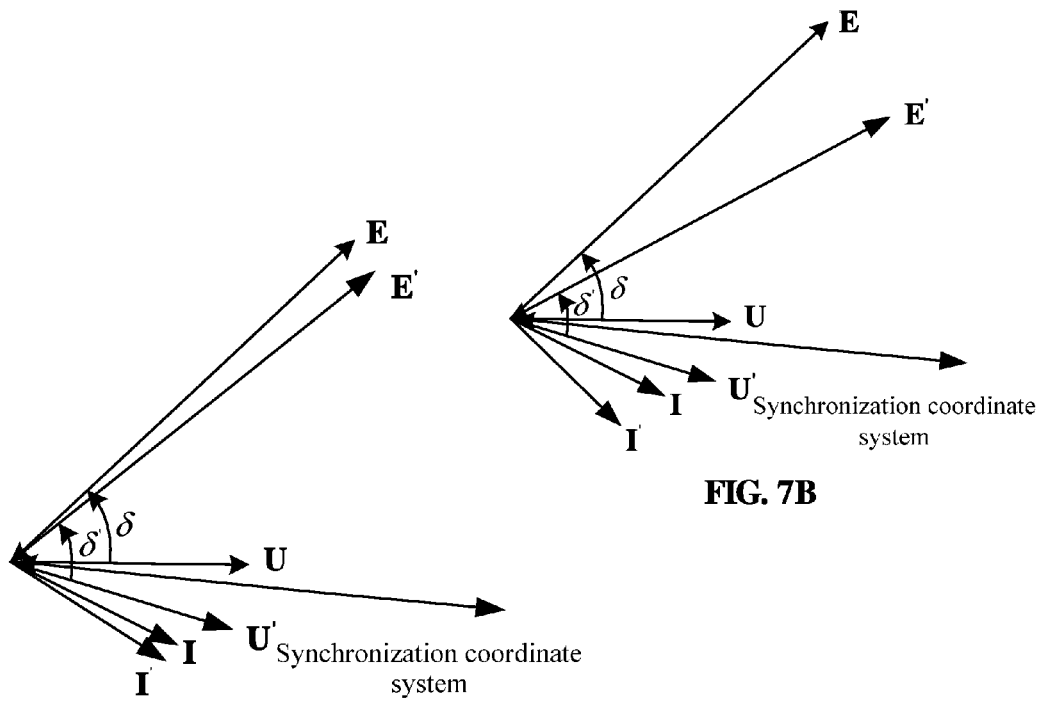
FIG. 7B
FIG. 7A
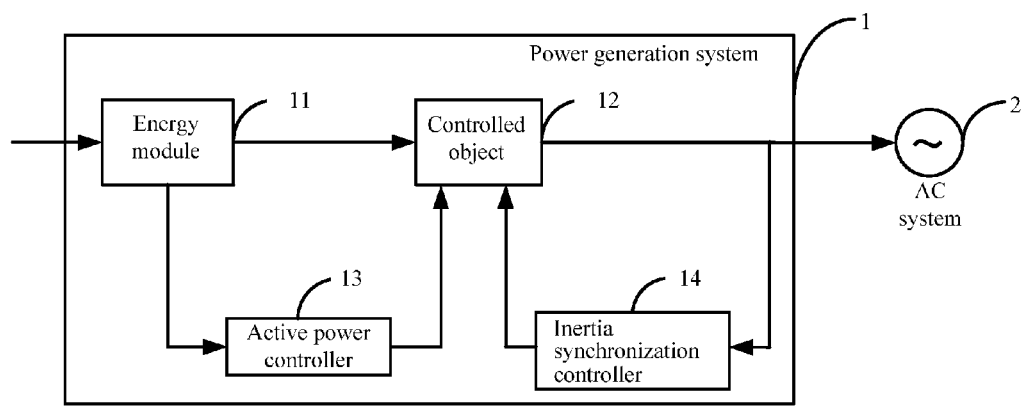
FIG. 8

POWER SUPPLY SYSTEM AND CONTROL METHOD THEREFOR

BACKGROUND OF THE INVENTION

Field of the Invention

The invention relates to a power supply system and a control method therefor.

Description of the Related Art

Conventional converter-controlled power supply systems cannot improve or enhance stability of the power systems. Stabilization capability refers to the ability of a device to enhance the stability of a system or other devices. Specifically, these power supply systems without inertia cannot provide synchronous torque in the power systems. Therefore, to replace synchronous motors with the converter-controlled power supply systems is unfavorable for stability of the power systems.

People have concerns about instability of the power systems caused by unconventional converter-controlled power supply systems, and some have proposed methods for inertial control, all of which have a feature in common, namely preset values of electromagnetic power or electromagnetic torque according to measured frequencies of the power systems, and thus output power of generators are varied, so that some functions of the synchronous motors are simulated. In details, as shown in FIG. 1, firstly a frequency of the power system is measured so as to obtain a change rate thereof, then a control instruction for the electromagnetic power or the electromagnetic torque is generated based on the change rate, which forces a rotation speed of the synchronous motor to change whereby releasing mechanical energy stored therein.

Although the above-mentioned methods are quite straightforward, it is required to measure the frequencies of the power systems, resulting in increase in control loops and cost, and certain unwanted impact on the generators by the control loops in operation.

SUMMARY OF THE INVENTION

In view of the above-mentioned problems, it is an objective of the invention to provide a power supply system with stabilization capability capable of providing inertia for AC systems for stability, and addressing problem with the power supply systems that increase in the number thereof may cause instability of grids.

To achieve the above objective, in accordance with one embodiment of the invention, there is provided a power supply system with stabilization capability, comprising an energy module, a controlled object, an active power controller, and an inertia-synchronization controller; an input end of the energy module operates to acquire external energy, a first output end of the energy module is connected to the controlled object, and the energy module operates to transform acquired energy into electric energy, or electric energy into another electric energy having a different frequency therefrom, an input end of the active power controller is connected to a second output end of the energy module, an output end of the active power controller is connected to the controlled object, and the active power controller operates to control output active power of the controlled object, and an input end of the inertia-synchronization controller operates to connect with an AC system, an output end of the inertia-synchronization controller is connected to the controlled object, and the inertia-synchronization controller operates to control synchronization between the power supply system and the AC system whereby providing inertia for the AC system for stability.

In a class of the embodiment, in operation, the active power controller controls the active power acquired by the controlled object from the energy module, the inertia-synchronization controller controls the electric energy acquired by the controlled object from the energy module to be transformed into AC having a same frequency as the AC system and inputs the AC to the AC system, the controlled object is capable of generating AC having a same frequency as the AC system under control of the active power controller and the inertia-synchronization controller, and varying the output active power as the frequency of the AC system fluctuates whereby providing inertia.

In a class of the embodiment, the inertia-synchronization controller comprises a grid information collection module, a signal processing module, an inertia control module, and an integration module, the grid information collection module operates to collect voltage information of the AC system, the signal processing module operates to performing filtering and coordinate transformation on collected voltage information whereby eliminating noise interference thereof, and to output a d-axis voltage or a q-axis voltage that is based on a dq coordinate system, the inertia control module operates to adjust an output angular frequency based on a difference between the d-axis voltage or the q-axis voltage and a given value, a response speed of the inertia-synchronization controller is low enough to enable the power supply system to provide stability for the AC system, and the integration module operates to performing integral operation on the output angular frequency whereby obtaining an output angle.

In a class of the embodiment, the inertia control module and the integration module are integrated.

In accordance with another embodiment of the invention, there is provided a control method for a power supply system, the power supply system comprising an inertia-synchronization controller connected to an AC system, and the control method comprising steps of, collecting voltage information of the AC system, performing filtering and coordinate transformation on collected voltage information whereby eliminating noise interference thereof, and outputting a d-axis voltage or a q-axis voltage that is based on a dq coordinate system, adjusting an output angular frequency based on a difference between the d-axis voltage or the q-axis voltage and a given value, a response speed of the inertia-synchronization controller is low enough to enable the power supply system to provide stability for the AC system, and performing integral operation on the output angular frequency whereby obtaining an output angle.

In a class of the embodiment, the method further comprises adjusting the responses speed of the active power controller according to inertia provided by the power supply system as required so that the response speed of the active power controller is reduced at a corresponding time scale.

In a class of the embodiment, the coordinate transformation is based on an output angle of the inertia-synchronization controller.

In a class of the embodiment, a static error between the d-axis voltage or the q-axis voltage and the given value is eliminated by adjusting the output angular frequency.

Advantages of the invention comprise:

1) the invention enables the conventional converter-controlled power supply system to improve stability of grids by generating inertia;

2) there is no need to measure a frequency of the power system and to add new control loops, which reduces cost of the power system, and is not to increase complexity thereof; and 3) the method of the invention generates inertia, as well as synchronous torque to resume synchronization with other equipments of the AC system.

DESCRIPTION OF THE DRAWINGS

FIG. 5A illustrates a physical relationship therebetween, and FIG. 5B illustrates a vector relationship therebetween;

FIGS. 7A and 7B are diagrams illustrating variation of vectors of a power supply system as a frequency and a synchronization speed thereof decrease; in particular, FIG. 7A illustrates variation of vectors as control of active power is comparably slow, and FIG. 7B illustrates variation of vectors as control of active power is comparably fast;

FIG. 8 is a block diagram of a power supply system with stabilization capability of an exemplary embodiment of the invention;

DETAILED DESCRIPTION OF THE EMBODIMENTS

For clear understanding of the objectives, features and advantages of the invention, detailed description of the invention will be given below in conjunction with accompanying drawings and specific embodiments. It should be noted that the examples are only meant to explain the invention, and not to limit the scope of the invention.

The invention is applied to converter-controlled power supply systems in wind power generation, solar power generation, energy storage, high-voltage direct current transmission and so on, and enables stability of a grid system by enabling a power supply system to provide inertia and synchronous torque therefor via variation of synchronous control.

Due to existence of a frequency and a phase of an AC system, stable power exchange thereof is facilitated by synchronization between alternating current of equipments connected to the AC system and that of the AC system.

There are different ways for synchronization, and phase-locked loop (PLL) synchronization is one that is commonly used.

Figure 1:
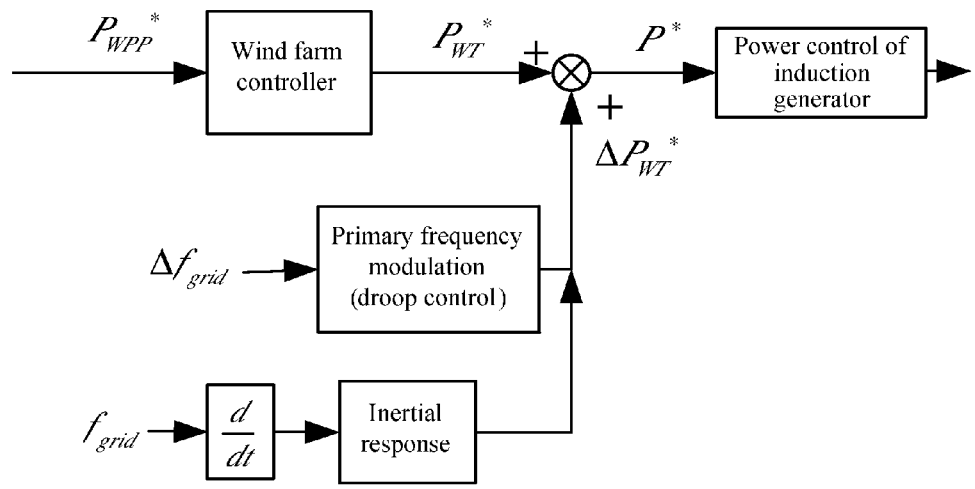
FIG. 1 illustrates a conventional method for providing inertia for a converter-controlled power supply system.
Figure 2:
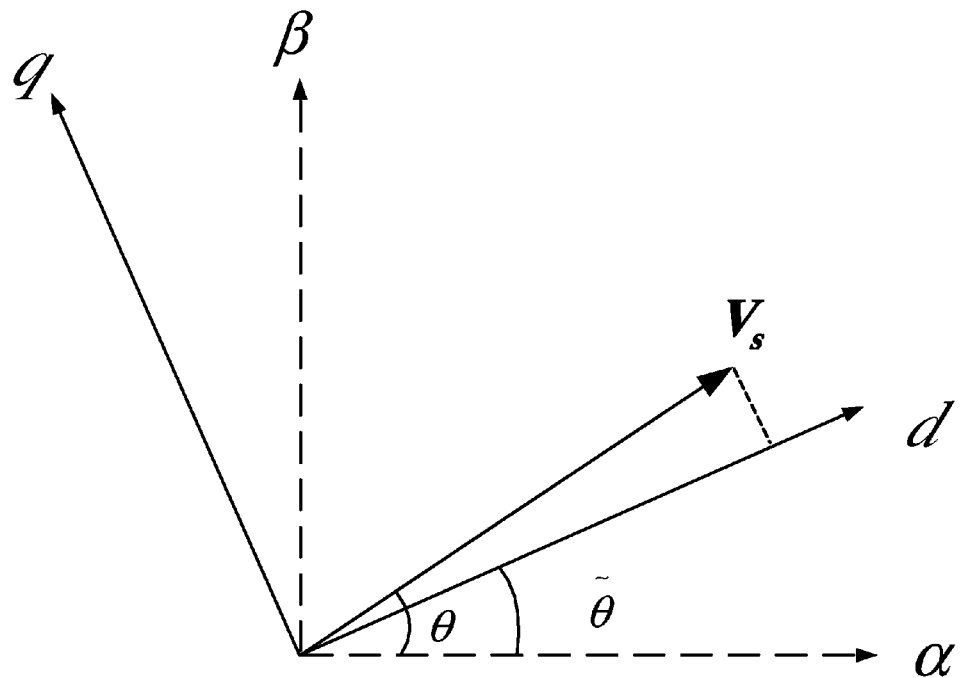
FIG. 2 is a vector diagram illustrating a principle of a phase-locked loop.
Figure 3:
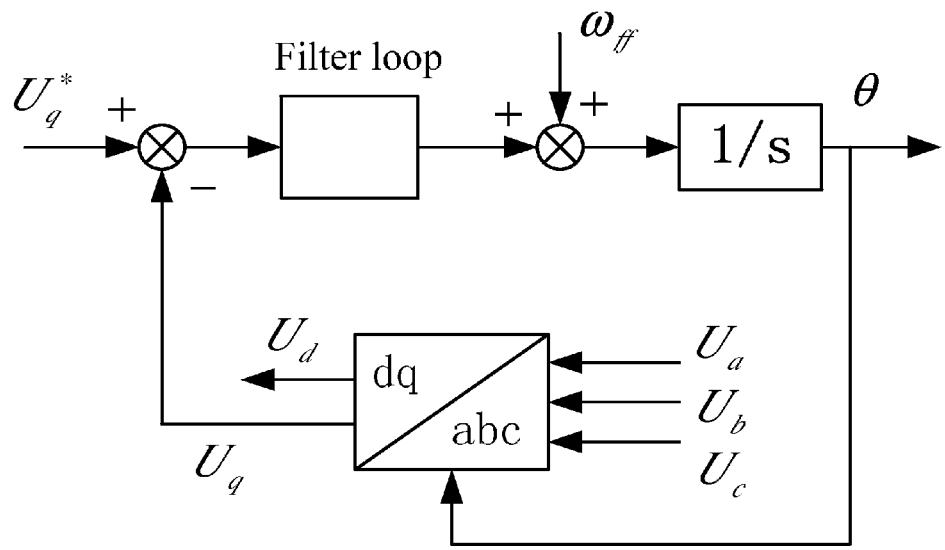
FIG. 3 is a fundamental block diagram of a phase-locked loop.

A phase-locked loop collects three-phase AC voltage of a grid-connected terminal, and performs Park's transformation thereon whereby projecting three-phase AC voltage $u_a$, $u_b$, $u_c$ in a static coordinate system onto a rotating two-axis dq coordinate system whereby forming a d-axis DC voltage $U_d$ and a q-axis DC voltage $U_q$. One of the d-axis DC voltage $U_d$ and the q-axis DC voltage $U_q$ (such as $U_d$) is selected as a reference component that locks a phase of grid voltage $V_s$ in a vector diagram. Once locked, $V_s$ is on the d-axis, and a value of the q-axis DC voltage $U_q$ is equal to 0. FIG. 2 illustrates a principle of synchronization of the phase-locked loop. FIG. 3 is a fundamental block diagram of the phase-locked loop. As a reference value $U^*_q$ of the q-axis DC voltage is set to zero, if a locked phase is inconsistent with that of a grid, the q-axis DC voltage $U_q$ is inconsistent with the reference value $U^*_q$ thereof. The phase-locked loop changes an output angle θ via a PI modulator until a resulting $U_q$ is equal to zero. At the time, phase of the AC system is locked by the phase-locked loop, and the output angle θ comprises a frequency and a phase of the AC system.

The phase-locked loop is used for tracking and synchronization of the frequency and the phase of the AC system, and provides a phase reference for a converter-controlled power supply system. For example, a double-fed induction generator and a full-converter synchronous generator are variable speed generators with a frequency of machine-side power different from the AC system, and thus cannot be connected to the AC system directly. Converters are required for connection therebetween (one disposed at a rectifier side transforms AC into DC, and the other one disposed at an inverter side inverts the DC into AC) whereby transforming AC generated by a power generator into AC having a same frequency as the AC system. Equipments such as photovoltaic generators and energy storage equipments output DC and cannot be connected to the grid directly. Upon being connected to the grid, the phase-locked loop needs to lock the phase of the AC system whereby obtaining phase information of the voltage at a grid-connected point and providing a reference for grid connection so that generated AC electric energy can be synchronized with the grid.

Figure 4:
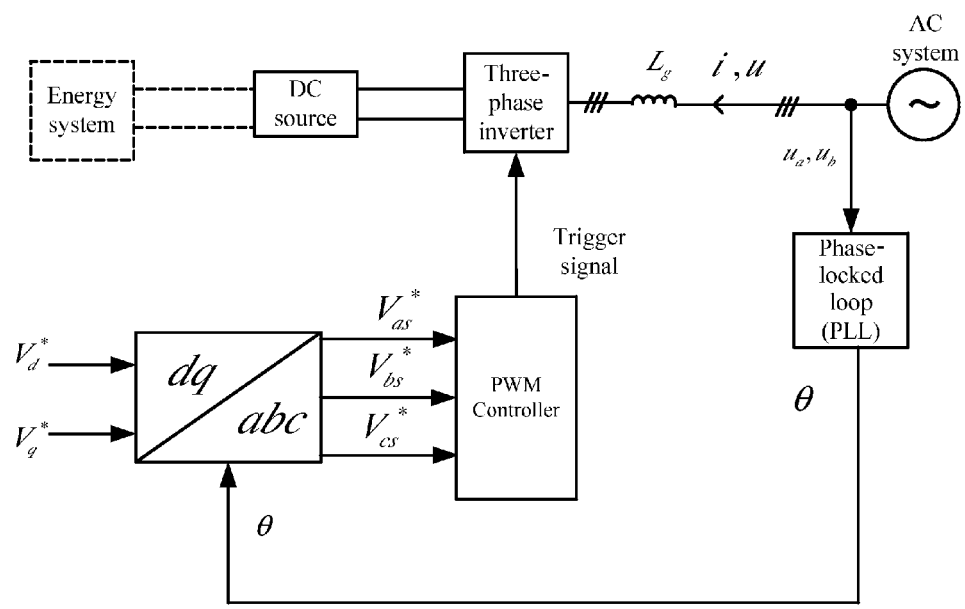
FIG. 4 illustrates a fundamental principle of synchronization of a phase-locked loop.

FIG. 4 illustrates a fundamental principle of synchronization of the phase-locked loop. A purpose of the synchronization is to transform power having different frequencies into AC having the same frequency as the AC system whereby facilitating synchronous operation therebetween. A control part of the converter controls a DC signal thereof. A pulse width modulation (PWM) controller of a three-phase converter controls a DC signal, and generates DC control instructions $V^*_d$ and $V^*_q$. Then inverse Park conformation is performed on $V^*_d$ and $V^*_q$ according to the output angle θ of the phase-locked loop whereby generating AC control instructions $V^*_{as}$, $V^*_{bs}$ and $V^*_{cs}$, which are input to the PWM controller whereby generating a trigger signal controlling on and off of a switch of the three-phase converter and transforming DC into AC. Since the output angle θ of the phase-locked loop comprises the frequency and the phase of the AC system, AC and the AC system are of the same frequency and a certain phase difference, and thus synchronization therebetween is facilitated.

A main objective of a conventional phase-locked loop control system is to fast and accurately lock a frequency and a phase of an AC system connected thereto, so that the converter-controlled power supply system can be fast synchronized with the AC system. To facilitate faster synchronization therebetween, the phase of the AC system should be locked by the phase-locked loop faster.

Two principles of designing a conventional phase-locked loop comprise: locking a phase of an AC system faster, which requires an operation speed thereof be much higher; and locking the phase of an AC system more accurately, which requires the phase-locked loop can filter interference such as negative sequence components generated during three-phase unbalance, harmonics and so on. Meanwhile, if the phase-locked loop operates in a voltage distortion status, it is also required to lock the frequency and the phase of the AC system. The voltage distortion is caused by unsymmetrical three-phase voltage, harmonics, DC bias and so on. The unsymmetrical three-phase voltage may increase the number of negative sequence components, which may generates second harmonics after dq transformation, the harmonics may generate $(6*N)^{th}$ harmonics (where N is a positive integer), and the DC bias may generate an AC component having the same frequency as the AC system. In an ideal situation, it is required to filter all these harmonics via a filtering loop so as to obtain DC components, but this will affect a speed of tracking the phase of the AC system by the phase-locked loop. Therefore, effect of the unsymmetrical three-phase voltage is mainly taken into account. To eliminate the effect thereof, an operation bandwidth of the filtering loop cannot be too high, which may in turn limit an operation bandwidth of the phase-locked loop.

To lock the phase of an AC system faster, an operation bandwidth thereof should be as large as possible. To lock the phase of an AC system more accurately, the operation bandwidth thereof should be as small as possible. Therefore, the conventional phase-locked loop employs an operation bandwidth that compromises the above-mentioned two requirements.

In the conventional converter-controlled power supply system, the phase-locked loop operates to provide a frequency and a phase of a grid, and an objective of conventional phase-locked synchronization control is to fast and accurately lock the frequency and the phase of the grid.

The conventional converter-controlled power supply system employing phase-locked loop synchronization does not add the control loop referred in the background, and cannot provide inertia for the AC system for stability. To solve this problem, it is required to analyze the reason why the conventional converter-controlled power supply system cannot provide inertia for stability.

Figures 5A, 5B:
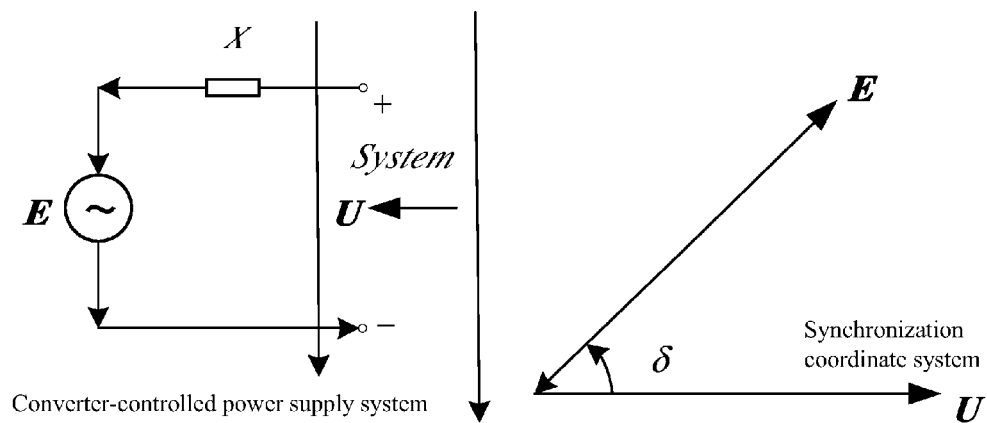
FIGS. 5A and 5B are diagrams illustrating a relationship between a vector of an internal potential and that of a terminal voltage; in particular.

As shown in FIG. 5A, from the perspective of a grid side, a converter-controlled power supply system can be equivalent to a power supply with an internal potential E and a reactance X. A phase of the internal potential E is established on a phase-locked loop synchronization coordinate system, namely the above-mentioned dq coordinate system. As the phase-locked loop accurately locks terminal voltage, the d-axis of the phase-locked loop synchronization coordinate system coincides with a terminal voltage vector U, and a power angle δ is shown in FIG. 5B. It should be understood that another coordinate axis of the phase-locked loop synchronization coordinate system is omitted for the purpose of simplicity.

Figure 6:
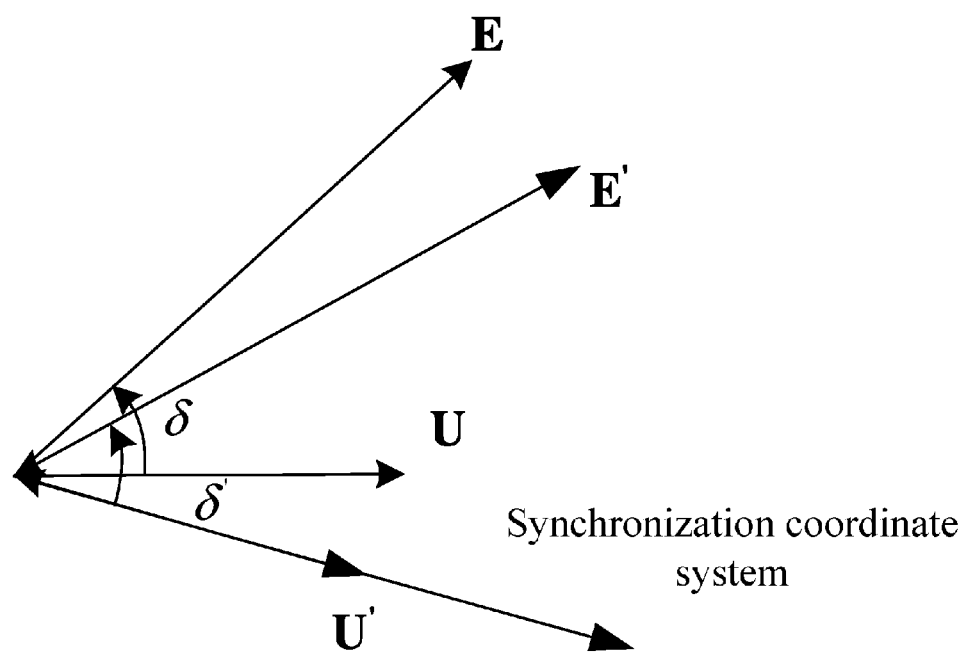
FIG. 6 is a diagram illustrating variation of vectors of a power supply system synchronized by a phase-locked loop as a frequency thereof is decreased.

A response speed of the conventional phase-locked loop is very high. An absolute output angle of the phase-locked loop with respect to a static coordinate system is equivalent to a slope response without static error, and an absolute output angle of the phase-locked loop with respect to a rotating coordinate system having the same rotating speed as the AC system is equivalent to a step response. As a gain of the phase-locked loop is very high (namely phase locking is very fast), variation of the gain almost coincides with an excitation thereof. As the frequency of the grid is reduced, a rotating speed of the terminal voltage vector U is decreased, and a position of the internal potential E needs to be determined in the synchronization coordinate system. As shown in FIG. 6, as the frequency of the grid varies, the synchronization coordinate system can timely track a phase of the terminal voltage vector U, and the internal potential E fast tracks the phase-locked loop under fast regulation of a current loop. Namely, the internal potential E timely tracks variation of the terminal voltage vector U, and a relative position therebetween is recovered to an original position prior to the variation. At the time no response can be made to improve stability of the AC system. For example, the power angle δ is almost constant, and electric energy generated by the converter-controlled power supply system is constant, therefore the converter-controlled power supply system employing the phase-locked loop cannot provide inertia for the AC system for preventing frequency variation thereof.

Disadvantages of synchronization facilitated by fast phase locking of the phase-locked loop are that it causes the converter-controlled power supply system to be unfriendly for the grid, and as fluctuation occurs in the grid, the fluctuation cannot be timely handled, which makes it impossible to improve stability of grid by providing inertia, synchronous torque and so on. In other words, in a conventional synchronization control method, a power supply system is incapable of providing stability for the grid: as the frequency of the grid fluctuates, the system cannot provide inertia thereto whereby prevention fast variation of the frequency, and as asynchrony occurs between the system and the grid, it is impossible to facilitate synchronization therebetween like a synchronous motor that provides synchronous torque. Due to a fact that accommodation of the grid to the power supply systems is limited, connection of the power supply systems therewith is greatly influenced. Therefore, to solve this problem, the ability of the power supply systems to enhance the stability of the grid should be improved.

To enable the converter-controlled power supply system to improve stability of the AC system by providing inertia thereto, it is required that variation of the AC system can affect the converter-controlled power supply system. From a perspective of an internal potential vector, as the frequency of the AC system varies, the power angle δ of the power supply system needs to be changed correspondingly so as to vary output thereof, which requires the internal potential vector of the power supply system cannot fast track the terminal voltage vector U. To implement this, firstly the synchronization coordinate system (a reference coordinate for the internal potential vector E) cannot fast track variation of the terminal voltage vector U. Thus, variation in the frequency of the AC system may have significantly impact on the power supply system.

However, it is not indeed the case that the synchronization coordinate system cannot fast track variation of the terminal voltage vector U, then the internal potential vector E cannot track variation of the terminal voltage vector U, which is because that the internal potential vector E is not only affected by synchronization control, but also by active power control.

As a first scenario, the response speed of synchronization control is comparatively low, and that of the active power control is comparatively low. The synchronization coordinate system cannot fast track variation of the terminal voltage vector U, and variation of the terminal voltage vector U occurs prior to the output angle θ of the phase-locked loop. As shown in FIG. 7A, the terminal voltage vector U moves to a new position U', and the synchronization coordinate system cannot fast track the variation of the terminal voltage vector U; as the response speed of the active power control is comparatively low, a movement speed of a current vector I with respect to the synchronization coordinate system is very low, and the current vector I moves to a new position I'. At the time a movement speed of the internal potential vector E with respect to the synchronization coordinate system is very low, a rotating speed of the terminal voltage vector U is greater than that of the internal potential vector E, a relative position therebetween varies, and the power angle δ is increased to δ', which provide inertia for the AC system. It can also be seen that as the response speed of synchronization control is comparatively low, if the response speed of active power control is also low, variation of the AC system may enable the generator to response. At the time, the power angle δ is increased to δ', and the generator applies more force, which generate inertia for the AC system for stability. The same result can be obtained as the frequency of the AC system increases.

As a second scenario, the response speed of synchronization control is comparatively low, but that of the active power control is very high. The phase-locked loop cannot fast track variation of the terminal voltage vector U, and variation of the terminal voltage vector U occurs prior to the output angle θ of the phase-locked loop. As shown in FIG. 7B, the terminal voltage vector U moves to the new position U', the synchronization coordinate system cannot fast track the variation of the terminal voltage vector U, but the response speed of the active power control is very high, as a result, a movement speed of a current vector I with respect to the synchronization coordinate system is very high, and the current vector I is adjusted to the new position I' under the action of the current loop. At the time, the movement speed of the internal potential vector E with respect to the synchronization coordinate system is very high, the power angle δ' fast decreases to δ, and the relative position between the internal potential vector E and the terminal voltage vector U fast recovers to an initial status, which make it impossible to provide inertia for the AC system.

As the internal potential vector is simultaneously affected by the synchronization control and the active power control, the rotating speed of the internal potential vector is superposition of response speeds of the synchronization control and the active power control. The control method of the invention comprises both the synchronization control and the active power control, both of which feature not-too-high response speeds. It should be emphasized that as inertia is a very important factor for stabilization capability and is easy to be provided, in operation, stability of the AC system is enabled by controlling the power supply system to provide inertia thereto. Meanwhile, an objective of the synchronization control is to enable the power supply system to generate inertia upon synchronization. Thus, this kind of synchronization control is referred to as inertia synchronization control.

As shown in FIG. 8, a power supply system with stabilization capability of the invention comprises an energy module 11, a controlled object 12, an active power controller 13, and an inertia-synchronization controller 14, an input end of the energy module 11 operates to acquire external energy, a first output end of the energy module 11 is connected to the controlled object 12, and the energy module 11 operates to transform acquired energy into electric energy, or electric energy into another electric energy having a different frequency therefrom, an input end of the active power controller 13 is connected to a second output end of the energy module 11, an output end of the active power controller 13 is connected to the controlled object 12, and the active power controller 13 operates to control output active power of the controlled object 12, and an input end of the inertia-synchronization controller 14 is connected to an AC system, an output end of the inertia-synchronization controller 14 is connected to the controlled object 12, and the inertia-synchronization controller 14 operates to control synchronization between the power supply system 1 and the AC system 2 whereby providing inertia for the AC system for stability.

In this embodiment, the controller object 12 is a controlled part that generates the internal potential vector (s). The active power controller 13 controls the active power acquired from the energy module 11 by the controlled object 12. The inertia-synchronization controller 14 controls the electric energy acquired by the controlled object 12 from the energy module 11 to be transformed into AC having a same frequency as the AC system 2 and inputs the AC to the AC system 2. The controlled object 12 is capable of generating AC having a same frequency as the AC system 2 under control of the active power controller 13 and the inertia-synchronization controller 14, and varying the output active power as the frequency of the AC system 2 fluctuates whereby providing inertia.

As the energy module 11 is a full-converter synchronous generator, it comprises primary energy conversion equipment such as a wind power generation turbine, a power generator, a machine-side converter, a DC capacitor, and a corresponding control system. The controlled object 12 comprises a grid-side converter and multiple filtering equipments.

As the energy module 11 is an energy storage equipment, it comprises an energy storage part such as a battery, a super capacitor, a flywheel, a superconductor and so on, a converter such as a DC/DC converter and so on, a DC capacitor, and a corresponding control system. The controlled object 12 comprises a grid-side converter and multiple filtering equipments.

As the energy module 11 is a HVDC system, it comprises an AC power supply for transforming energy, a rectifier, a DC capacitor, and a corresponding control system. The controlled object 12 comprises a grid-side converter and multiple filtering equipments.

As the energy module 11 is a photovoltaic generator, it comprises a photovoltaic solar collector, a DC conversion system, an energy storage system, a DC capacitor, and a corresponding control system. The controlled object 12 comprises a grid-side converter and multiple filtering equipments.

As the energy module 11 is a double-fed induction generator with an internal potential on each of a stator side and a rotor side thereof, and the internal potential on the rotor side mainly performs a control function. The energy module 11 comprises primary energy conversion equipment such as a wind power generation turbine, a double-fed induction generator, and a corresponding control system. The controlled object 12 comprises a machine-side converter and a grid-side converter at the rotor side, a DC capacitor, a stator of the double-fed induction generator, and an AC power transmission system.

Figure 9:
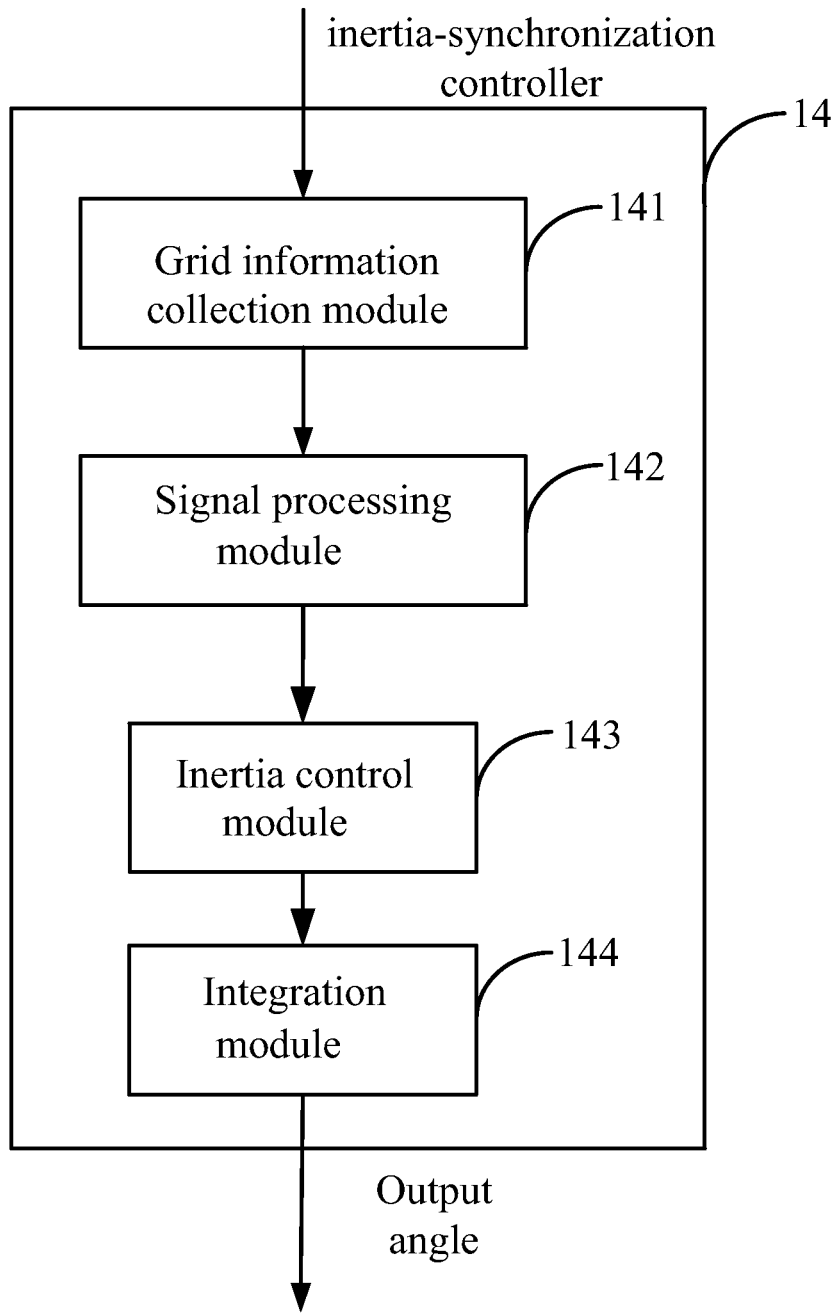
FIG. 9 is a schematic diagram of an inertia-synchronization controller in the power supply system with stabilization capability.

FIG. 9 illustrates a block diagram of an inertia-synchronization controller 14, in which an input signal thereof is AC voltage of the AC system 2, and an output signal thereof is an angle. The inertia-synchronization controller 14 comprises a grid information collection module 141, a signal processing module 142, an inertia control module 143, and an integration module 144. The grid information collection module 141 operates to collect voltage information of the AC system 2, which may be three-phase voltage information, or two-phase voltage information. The signal processing module 142 operates to performing filtering and coordinate transformation on collected voltage information whereby eliminating noise interference thereof, and to output a d-axis voltage or a q-axis voltage that is based on a dq coordinate system. The inertia control module 143 operates to adjust an output angular frequency based on a difference between the d-axis voltage or the q-axis voltage and a given value. The integration module 144 operates to performing integral operation on the output angular frequency whereby obtaining an output angle.

Specifically, the grid information collection module 141 mainly collects the two-phase voltage information of the AC system 2 in operation. The signal processing module 142 performs filtering and coordinate transformation on collected voltage information. The inertia control module 143 adjusts the response speed of the inertia-synchronization controller 14 to be low enough whereby enabling the power supply system 1 to provide inertia for the AC system 2 for stability. This is implemented by ensuring that internal potential vectors in a synchronization coordinate system are not to track variation in terminal voltage vectors. The integration module 144 performs integral operation on the output angular frequency from the inertia control module 143 whereby generating a control signal synchronizing the converter-controlled power supply system 1 with the AC system 2.

A control method for a power supply system with stabilization capability of the invention comprises steps of:

S1: collecting voltage information of an AC system.

S2: performing filtering and coordinate transformation on collected voltage information whereby eliminating noise interference thereof, and outputting a d-axis voltage or a q-axis voltage that is based on a dq coordinate system; In this embodiment, the coordinate transformation is based on an output angle of an inertia-synchronization controller whereby enabling closed-loop control.

S3: adjusting an output angular frequency based on a difference between the d-axis voltage or the q-axis voltage and a given value; a response speed of the inertia-synchronization controller is low enough to enable the power supply system to provide stability for the AC system, and there is no static error between resulting d-axis voltage or q-axis voltage and the given value, making it possible to track the frequency and the phase of the AC system without the static error; normally the given value is equal to zero.

S4: performing integral operation on the output angular frequency whereby obtaining an output angle.

It should be noted that in some cases inertia control and synchronization control are combined with each other.

In an embodiment of the invention, for the active power control, the response speed thereof determines inertia that the power supply system can provide for the AC system. The required amount of inertia that the power supply system provides for the AC system is determined by reducing the response speed of the active power control at a corresponding time scale.

The invention can enable a conventional grid-connected power supply system employing phase-locked loop synchronization to improve stability of a grid based on software and hardware conditions of the power supply system without varying a topology thereof. At the time, the invention is capable of reducing cost and maintaining complexity of the power supply system without the need to measure the frequency of the AC system and to establish a control loop. Moreover, the method of the invention is capable of providing inertia as well as synchronous torque whereby recovering synchronization between the AC system and the power supply system.

For clear explanation of the power supply system with stabilization capability and the control method therefor of the invention, an exemplary method for designing a controller in an inertia-synchronization controller will be given below.

As discussed hereinbefore, a conventional synchronization controller is the phase-locked loop that requires an operation bandwidth thereof is as large as possible for fast phase locking on one hand, and the operation bandwidth thereof cannot be too large for filtering a negative sequence component in three-phase unbalance on the other hand. Therefore, the operation bandwidth of the phase-locked loop in operation is a compromise between fast phase locking and filtering.

A factor that needs to be taken into consideration in designing the inertia-synchronization controller is different from that in the phase-locked loop: firstly, since the operation bandwidth of the inertia-synchronization controller is significantly reduced, filtering performance thereof of the invention is better than that of the conventional phase-locked loop for fast phase locking, and filtering is no longer a main factor that needs to be considered during design of the synchronization control. Secondly, an objective of the synchronization control is not to fast lock the phase of the AC system, but to improve stability thereof, therefore a principle of designing the synchronization control is to improve stability of AC system. Thirdly, problems caused by a decreased synchronization speed of the inertia-synchronization controller are different from that caused by the PLL, and impact of the AC system on the power supply systems with stabilization capability increases and the power supply systems are greatly influenced, therefore in designing the inertia-synchronization controller, capability of the converter-controlled power supply system providing energy to the AC system, over-current capability of converters and etc. need to be considered. To summarize, main principles in designing the inertia synchronization controller comprise meeting requirement for stability of the AC system, and at the same time, taking requirement for self-stability into account.

Next design of parameters of a controller (such as a PI controller commonly used in a controller) in the inertia-synchronization controller for providing inertia will be described below.

Taking the double-fed induction generator for example, firstly an integral coefficient $K_i$ is determined as follows:

Firstly, small signal analysis and a large amount of simulation results indicate that after the synchronization speed of the power supply system is reduced, an inertia time constant $H_{eq}$ of the generator in the grid is determined by $1/K_i$ to some extent. The generator itself is a mass block with an inertia time constant H determined by an intrinsic structure thereof:

$$H = \frac{\frac{1}{2}J\omega_0^2}{S_0},$$

where J represents a rotating inertia constant, $\omega_0$ represents a rated value of a rotating speed, and $S_0$ represents a rated value of apparent power. Since the conventional generator does not provide inertia for the AC system, the equivalent inertia time constant $H_{eq}$ thereof in the grid is nearly zero. However, different from a synchronous motor, the equivalent inertia time constant $H_{eq}$ of the generator can be adjusted by, for example, properly designing a phase-locked loop. As $1/K_i$ gradually increases (namely $K_i$ gradually decreases), an equivalent inertia time constant $H_{eq}$ of the generator tends to increase. An inertia time constant of a typical synchronous motor in the power supply system is 2-9 s. By adjusting $K_i$, it is possible for the equivalent inertia time constant $H_{eq}$ of the generator to be equivalent to, or even better than that of the synchronous motor. The equivalent inertia time constant $H_{eq}$ of the generator can be estimated by a formula $$\frac{\partial f}{\partial t} = \frac{\Delta P}{2H_{eq}},$$

where $$\frac{\partial f}{\partial t}$$

represents a change rate of a frequency of the AC system, and $\Delta P$ represents a variation of output power of the generator. Since the variation of output power of the generator is variable, and the change rate of a frequency of the AC system is inconstant, it is possible to estimate the equivalent inertia time constant $H_{eq}$ of the generator by averaging increased output power of the generator and variations of the frequency f of the AC system at different time. To summarize, by adjusting the integral coefficient $K_i$, the equivalent inertia time constant $H_{eq}$ of the power supply system can be greater than or equal to, namely better than, that of the synchronous motor.

Secondly, capability of a generator providing inertia to the grid is limited, over supply of mechanical energy thereby may cause the generator cannot recover to a stable status and become stalling (as $K_i$ is too small to be accepted by the generator, stalling may take place). A first necessary condition for preventing stalling as synchronization slows down is that impact of the response speeds of the inertia synchronization control and the active power control on internal potential of the generator should be greater than that of variation of rotating speeds of the inertia synchronization control and the active power control thereon. Thus, as the speed of the generator is reduced, a power angle thereof and power transformed to the grid thereby are decreased, and the mechanical system is not required to keep supplying power thereto.

Another necessary condition for preventing stalling as synchronization slows down is that as the power angle of the generator decreases, a rotating speed thereof can be increased by ensuring input power obtained from wind power by the generator is greater than output power transformed to the grid thereby, which is based on the parameter $K_i$.

The parameter $K_i$ can be determined either by mathematically calculating a boundary value of the parameter $K_i$ in each of the two conditions, and further verifying the boundary value thereof, or by gradually reducing the value of $K_i$ till reaching a limit that causes instability of the generator. In addition, since output power of an generator generating inertia may varies with the AC system, especially as the output power thereof increases, over current capability of a converter also needs to be considered. Based on the aforementioned methods, it can be ensured that $K_i$ is within a stable region.

To summarize, different from design of $K_i$ of the conventional phase-locked loop that is based on filtering performance, the invention determines $K_i$ for the purpose of providing inertia for the AC system for stability. During design of $K_i$, capability of equipments supplying power and that of the converter also need to be considered whereby ensuring normal operation of the power supply system.

Next determination of a proportional coefficient $K_p$ will be described.

Small signal analysis and a large amount of simulation results indicate that $K_p$ determines damping of the power supply system. As $K_p$ decreases, the damping of the power supply system tends to decrease; as $K_p$ is too small, the damping of the power supply system is insufficient, and oscillation thereof may take place; as $K_p$ is too large, a response speed of the power supply system is too low, which may cause instability of the mechanical system. Therefore, the damping of the power supply system should be selected based on teaching of engineer handbooks and requirements therefor, and the proportional coefficient $K_p$ should be determined by the selected damping of the power supply system.

From the above example, it can be seen that design of the inertia synchronization control of the invention is different from that of the conventional phase-locked loop control. It should be appreciated that other methods for reducing the operation bandwidth of the inertia-synchronization controller whereby providing inertia for the AC system for stability, such as a method of serially connecting the PI controller to a low-pass filter, that of serially connecting the PI controller to a corrector or other controllers and so on are similar to the method of the invention.

The conventional synchronization control based on the phase-locked loop is designed for the purpose of accurate and fast phase locking, and the new control method relates to inertia synchronization control operating to improve stabilization capability of the power supply system (for example by providing inertia therefor) based on software and hardware infrastructure of the phase-locked loop so that the power supply system cannot response fast with variation of the grid. At the time the phase-locked loop has become a new synchronization device, i.e. an inertia-synchronization controller capable of providing inertia for the AC system.

It should be emphasized that as for the control method of the invention, slow inertia synchronization control is one premise for facilitating a stable grid by the converter-controlled power supply system, and another premise is that active power control cannot be too fast, otherwise the active power is to fast recover to a preset value, and the power supply system still lacks capability of providing inertia for the grid.

Figure 10:
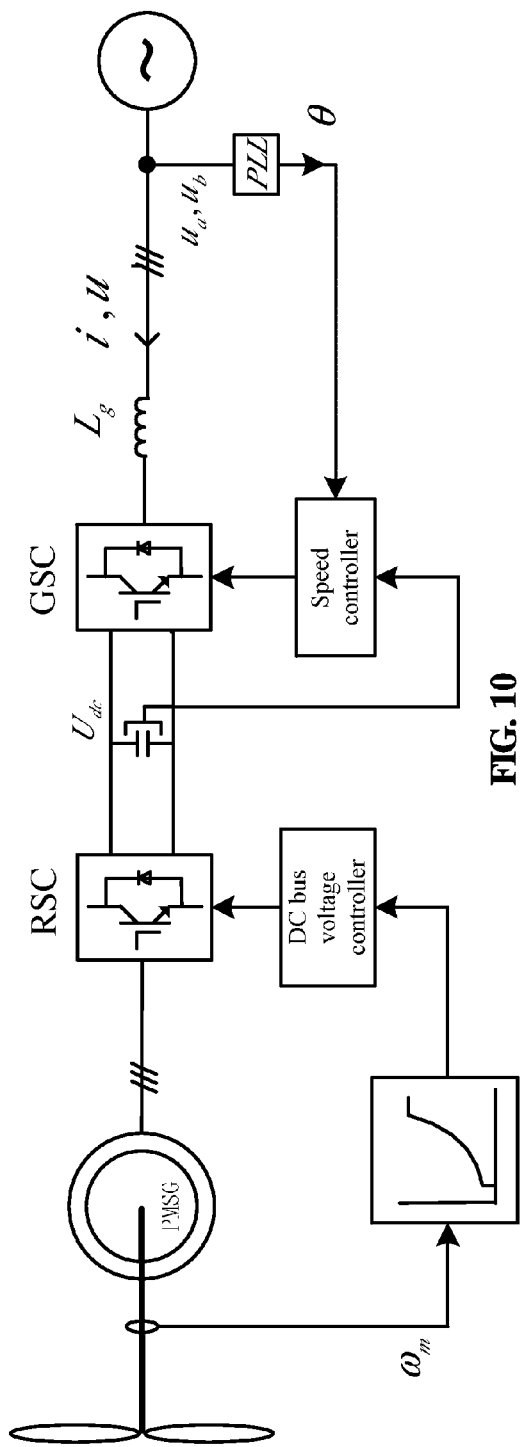
FIG. 10 is a topology diagram of a full-converter synchronous generator as control of active power is comparatively fast.

As shown in FIG. 10, a typical control method for a full-converter synchronous generator is illustrated as an example. A basic principle of the control method is to control a rotating speed thereof via a machine-side converter, and to control DC bus voltage via a grid-side converter. And a DC bus voltage controller with a fast response speed is used for active power control. In this case, the power supply system cannot generate inertia at a corresponding time scale even if the inertia synchronization control responses very slow.

Figure 11:
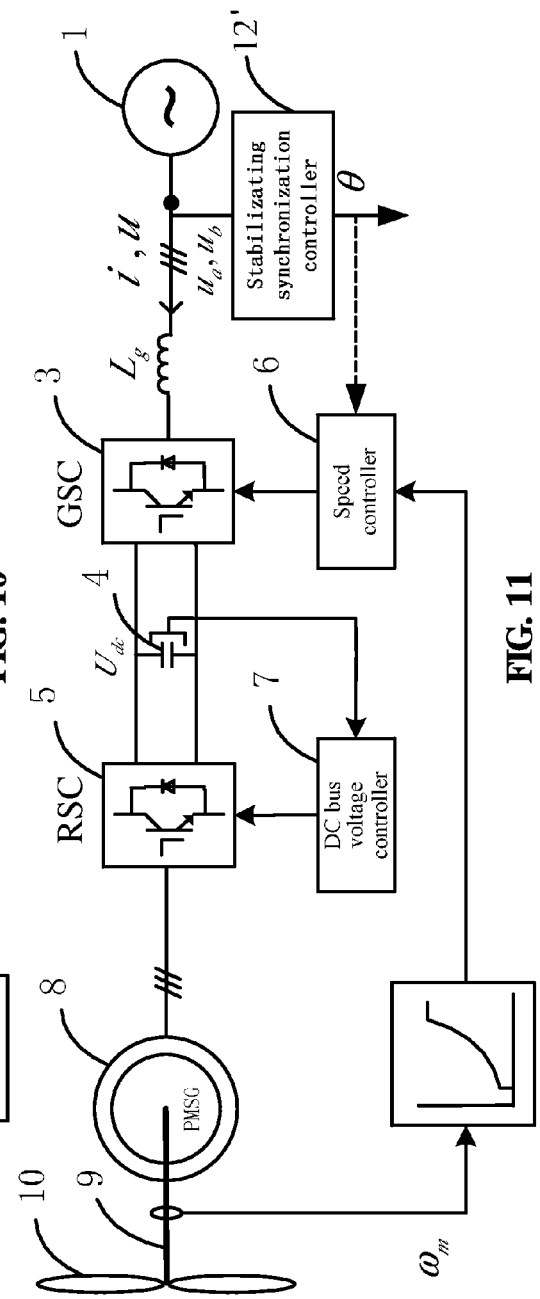
FIG. 11 is a topology diagram of a full-converter synchronous generator as control of active power is comparatively slow.

In view of the above-mentioned problem, it is required to redesign the active power control whereby reducing an operation bandwidth thereof in different methods. For example, one method is to use the grid-side converter for controlling the rotating speed of the full-converter synchronous generator, and to use the machine-side converter for controlling the DC bus voltage thereof, as shown in FIG. 11. In this control method, the active power control features slow response as involving a speed control loop, and therefore the power supply system can generate inertia.

In some power supply systems, active power control facilitated by double-fed induction generators and some kinds of full-converter synchronous generators is very slow. At the time, an objective of generating inertia and improving stability can be achieved by solely designing the inertia synchronization control.

By using the control method of the invention, the power supply system of the invention can become a system with high stabilization capability, and more relevant details will be given below.

Figure 12:
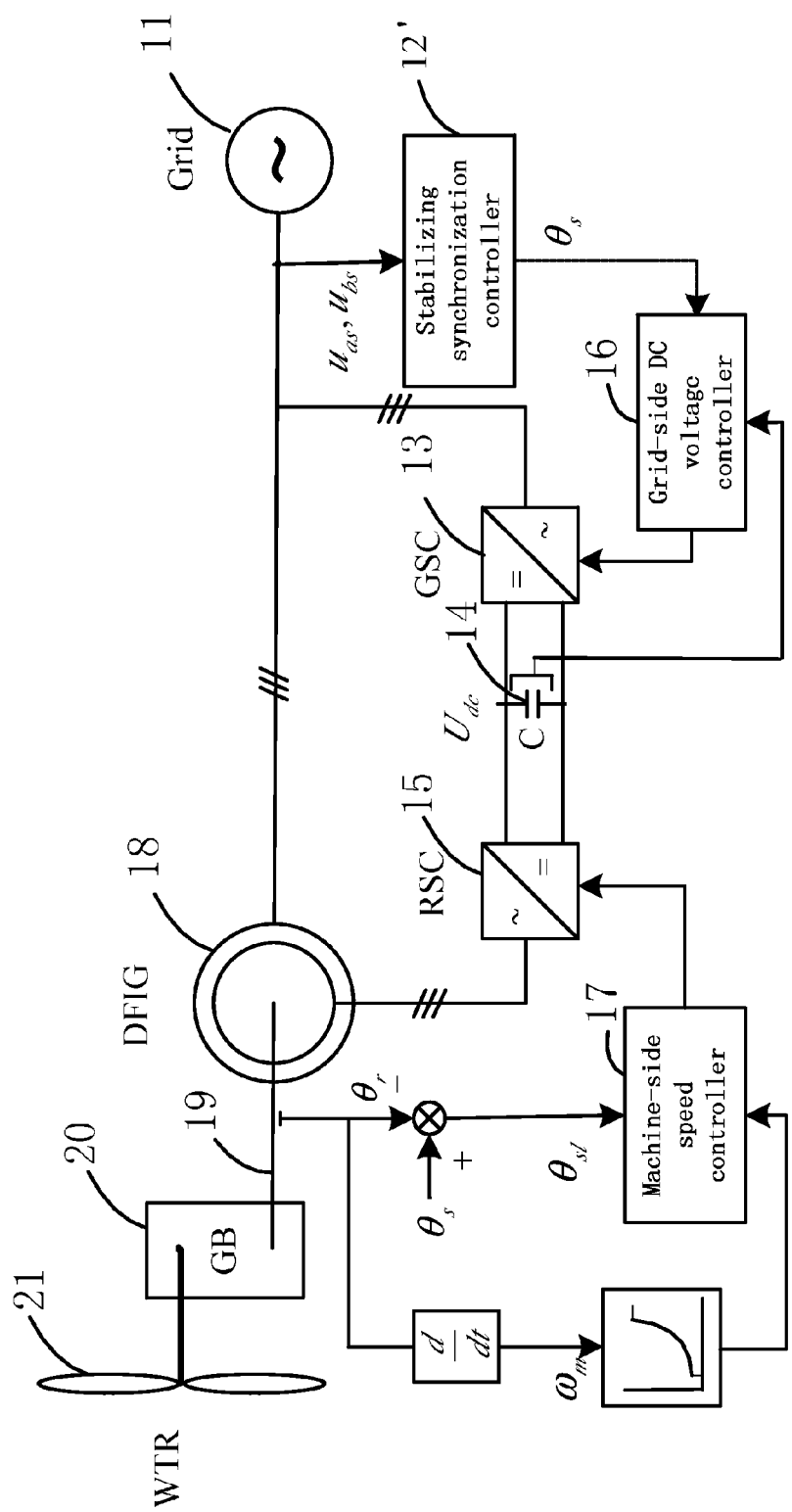
FIG. 12 is a topology diagram of a double-fed induction generator.

For the double-fed induction generator, as shown in FIG. 12, as the frequency of the grid varies, since response of the synchronization control is comparatively slow, output of a stabilizing synchronization controller 12' cannot track a voltage phase of the grid in a comparatively wide time interval. A reference angle of the dq transformation conducted by the machine-side converter 15 is obtained by performing operation on an angle output by the stabilizing synchronization controller 12' and that of a rotor of a power generator 18. As the angle output by the stabilizing synchronization controller 12' is inaccurate for a comparatively wide time interval, output power of the machine-side converter 15 and the grid-side converter 13 is to be significantly affected. As the output power of the machine-side converter 15 varies, electromagnetic torque of a machine-side motor, and rotating speeds of rotating components, such as a rotor of a motor 18, a transmission shaft 19, a gear 20, a blade 21 and so on are changed whereby emitting mechanical energy stored therein. Operation of a machine-side speed controller 17 varies the output power of the machine-side converter. Thus, power unbalance between the grid-side converter 13 and the machine-side converter 15 results in voltage fluctuation of a DC bus capacitor 14, and a grid-side DC voltage controller 16 controls the output power of the grid-side converter 13, which changes power transformed to the grid 11 by the generator, and enables the generator to provide inertia to the grid 11.

As for the full-converter synchronous generator, as shown in FIG. 11, as the frequency of the grid varies, since response of the synchronization control is comparatively slow, output of a stabilizing synchronization controller 2 cannot track a voltage phase of the grid in a comparatively wide time interval.

Since a reference angle of the dq transformation conducted by a grid-side converter 3 is obtained by performing operation on an angle output by the stabilizing synchronization controller 2, as the synchronization control is comparatively slow, the grid-side converter 3 is affected, and power transformed to the grid 1 is varied. As the output power of the grid-side converter 3 is varied and that of the machine-side converter 5 is constant, power unbalance therebetween results in fluctuation of voltage $U_{de}$ on a DC bus capacitor 4, and deviation of the voltage from a preset value. At the time a DC bus voltage controller 7 controls the output power of the machine-side converter 5. As the output power of the machine-side converter 5 varies, electromagnetic torque of a machine-side motor, and rotating speeds of rotating components, such as a rotor of a motor 8, a transmission shaft 9, a blade 10 and gears in some full-converter synchronous generators are changed whereby emitting mechanical energy stored therein. At the time, operation of a speed controller 6 varies the output power of the grid-side converter 3, which changes power transformed to the grid 1 by the generator, and enables the generator to provide inertia for the grid 1.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A control method for a power supply system, the power supply system comprising an inertia-synchronization controller connected to an AC system, and the control method comprising steps of:
   a) controlling synchronization between the power supply system and the AC system by the inertia-synchronization controller via:
      a1) collecting voltage information of the AC system;
      a2) performing filtering and coordinate transformation on the collected voltage information whereby eliminating noise interference thereof, and outputting a d-axis voltage or a q-axis voltage that is based on a dq coordinate system;
      a3) adjusting an output angular frequency based on a difference between the d-axis voltage or the q-axis voltage and a given value; and
      a4) performing integral operation on the output angular frequency whereby obtaining an output angle; and
   b) lowering a response speed of the inertia-synchronization controller to the synchronization between the power supply system and the AC system to provide inertia for the AC system.

2. The control method of claim 1, wherein the coordinate transformation is based on an output angle of the inertia-synchronization controller.

3. The control method of claim 1, wherein a static error between the d-axis voltage or the q-axis voltage and the given value is eliminated by adjusting the output angular frequency.

4. The control method of claim 1, further comprising:
   applying an active power controller for controlling active power input to or output from the power supply system; and
   lowering a response speed of the active power controller to increase the inertia provided by the power supply system for the AC system.

5. The control method of claim 4, wherein the response speed of the inertia-synchronization controller and the response speed of the active power controller are set so as the power supply system has an inertia time constant of 2-9 s as a synchronous motor.

6. A control method for a power supply system, the power supply system comprising an inertia-synchronization controller connected to an AC system, and the control method comprising:
   a) collecting voltage information of the AC system;
   b) performing filtering and coordinate transformation on the collected voltage information whereby eliminating noise interference thereof, and outputting a d-axis voltage or a q-axis voltage that is based on a dq coordinate system;

c) adjusting an output angular frequency based on a difference between the d-axis voltage or the q-axis voltage and a given value; a response speed of the inertia-synchronization controller is low enough to enable the power supply system to provide inertia for the AC system and correspondingly provide stability for the AC system;

d) performing integral operation on the output angular frequency whereby obtaining an output angle;

e) applying an active power controller for controlling active power input to or output from the power supply system; and f) adjusting a response speed of the active power controller according to the inertia provided by the power supply system for the AC system so that the response speed of the active power controller is at a time scale of 2-9 s.

7. The control method of claim 6, wherein the response speed of the inertia-synchronization controller and the response speed of the active power controller are set so as the power supply system has an inertia time constant of 2-9 s as a synchronous motor.

* * * * *